(12) United States Patent
Carroll et al.

(10) Patent No.: US 8,412,923 B2
(45) Date of Patent: Apr. 2, 2013

(54) MULTI-MODE PIN USAGE IN A POWER SUPPLY CONTROL INTEGRATED CIRCUIT

(75) Inventors: Robert T. Carroll, Andover, MA (US);
Ronald Hulfachor, Nashua, NH (US);
Dror Barash, Brookline, MA (US);
Frank Kern, Bellingham, WA (US)

(73) Assignee: International Rectifier Corporation, El Segundo, CA (US)

( * ) Notice: Subject to any disclaimer, the term of this patent is extended or adjusted under 35 U.S.C. 154(b) by 372 days.

(21) Appl. No.: 12/703,082

(22) Filed: Feb. 9, 2010

(65) Prior Publication Data

US 2011/0004748 A1 Jan. 6, 2011

Related U.S. Application Data

(60) Provisional application No. 61/269,986, filed on Jul. 1, 2009.

(51) Int. Cl.
*G06F 1/24* (2006.01)
*G06F 1/26* (2006.01)

(52) U.S. Cl. ........................................ 713/100; 713/300

(58) Field of Classification Search .................. 713/300, 713/100
See application file for complete search history.

(56) References Cited

U.S. PATENT DOCUMENTS

| | | | |
|---|---|---|---|
| 6,388,853 B1 * | 5/2002 | Balakrishnan et al. | 361/93.9 |
| 6,710,621 B2 * | 3/2004 | Devlin et al. | 326/38 |
| 6,750,640 B2 * | 6/2004 | Balakrishnan et al. | 323/314 |
| 6,850,048 B2 * | 2/2005 | Orr et al. | 323/299 |
| 6,897,677 B2 * | 5/2005 | Devlin et al. | 326/38 |
| 7,345,378 B2 * | 3/2008 | Pearce | 307/24 |
| 7,564,725 B2 * | 7/2009 | Houston | 365/189.09 |
| 7,646,621 B2 * | 1/2010 | Kent | 363/147 |
| 7,782,083 B2 * | 8/2010 | Lalithambika et al. | 326/38 |
| 8,024,138 B2 * | 9/2011 | Carroll et al. | 702/60 |
| 2006/0053319 A1 * | 3/2006 | Balakrishnan et al. | 713/300 |
| 2006/0055388 A1 * | 3/2006 | Tang et al. | 323/284 |
| 2006/0171230 A1 * | 8/2006 | Bacchus et al. | 365/226 |
| 2009/0172656 A1 * | 7/2009 | Landry et al. | 717/173 |

* cited by examiner

*Primary Examiner* — Chun Cao
(74) *Attorney, Agent, or Firm* — Chapin IP Law, LLC

(57) ABSTRACT

An integrated circuit resides on a circuit board. During operation, the digital controller integrated circuit produces control signals to control a power supply for delivery of power to a load. The integrated circuit can include multiple connectivity ports, on-board memory, and mode control logic. The multiple connectivity ports such as pins, pads, etc., of the integrated circuit can be configured to provide connections between internal circuitry residing in the integrated circuit and external circuitry residing on a circuit board to which the integrated circuit is attached. The mode control logic monitors a status of one or more connectivity ports of the integrated circuit to detect when a board handler places the digital controller in a power island mode in which the integrated circuit is powered so that the board handler can access (e.g., read/write) the memory in the digital controller integrated circuit while other portions of the board are unpowered.

16 Claims, 8 Drawing Sheets

MULTI-MODE PIN USAGE IN A POWER SUPPLY CONTROL INTEGRATED CIRCUIT

RELATED APPLICATION

This application is related to and claims the benefit of earlier filed U.S. Provisional Patent Application Ser. No. 61/269,986 entitled "Voltage Regulator Circuitry and Non-volatile Memory,", filed on Jul. 1, 2009, the entire teachings of which are incorporated herein by this reference.

BACKGROUND

It is known that a conventional digital voltage regulator can be used to regulate a DC voltage supplied to a load such as a microprocessor. For example, a voltage regulator can include a power converter, such as a DC-DC converter, and may include other components such as a digital controller for controlling operation of the power converter. Typically, conventional digital controllers control operation of multiple switches in a power supply to regulate an output voltage within a desired range.

Because real estate consumed on a printed circuit board may be limited, it is typically desirable to reduce a size of components associated with a power supply circuit. One way to reduce size is to implement all or part of the digital controller in a semiconductor chip that mounts directly to a corresponding circuit board being powered.

To provide increased performance and optimization for a specific power supply design, conventional digital controller circuits can include non-volatile memory for storing data such as power supply trim information. The data stored in the non-volatile memory can be used for a number of reasons. For example, the data can be used to at least in part to store custom trim information for a particular circuit board.

The trim information or other data can be written to the non-volatile memory of the digital controller at a number of different stages of manufacturing. For example, it is possible that a manufacturer of the digital controller chip writes custom data to the non-volatile memory prior to shipping the parts to a customer who then mounts the already programmed parts onto respective circuit boards.

BRIEF DESCRIPTION

Conventional applications such as those as discussed above can suffer from a number of deficiencies. For example, one problem with programming circuit components before they are shipped to a customer is that different customers may require that delivered components be programmed with different non-volatile memory data. The customer must specify the appropriate data to be written to the memory before the parts are shipped. Tracking uniquely programmed digital controllers can be logistically complex and therefore costly. For example, a vendor must assign a part number for each of multiple digital controllers programmed with a same set of data.

One solution to programming non-volatile memory is to enable programming of the non-volatile memory by a customer instead of programming the information at the part vendor. For example, an integrated circuit can be configured to include an extra set of input/output pins whose sole use is for programming memory in the controller so that the customers can program the digital controllers during manufacturing or possibly even in the field.

However, although it is possible to add pins and extra circuitry to a digital controller, the inclusion of extra input/output pins on an integrated circuit to support programming of on-chip storage by a customer is undesirable because of packaging concerns. For example, inclusion of the additional pins on an integrated circuit increases a package size of the integrated circuit. Increasing a size of an integrated circuit package to accommodate the extra pins is also undesirable because the integrated circuit package will require a larger footprint for mounting of the integrated circuit on a printed circuit board. Increasing a package size to include more pins also makes it more difficult to mount the integrated circuit to the circuit board, reducing manufacturing yields. In other words, an integrated circuit package is more likely to fail in the field when it includes additional pins.

In most instances, the non-volatile memory of the digital controller is written only once during manufacturing and is not written to again after the product ships to a customer or user. Thus, any programming interface circuitry in the digital controller that is required to write data to on-chip non-volatile memory remains largely unused during actual operation of controlling a corresponding power supply circuit.

In contrast to conventional methods and the different possible ways of implementing on-chip non-volatile memory solutions as discussed above, embodiments herein include providing an improved way of implementing on-chip storage such as non-volatile memory (NVM) in a digital voltage regulator (VR) controller. For example, one embodiment herein enables programming of on-chip storage without having to power up the entire printed circuit board to which the integrated circuit package is mounted.

Another embodiment herein includes reuse of pins in different modes such that a pin count for the respective chip is not increased (or is increased minimally) as a result of providing the ability to program the on-chip non-volatile memory.

In yet other embodiments, it is not necessary to power up the entire board under test in order to program the on-chip memory. Instead, only a portion of a circuit board is powered so that the on-chip storage can be programmed. This is useful over conventional techniques since most testers typically cannot supply the power needed to power a whole printed circuit board.

More specifically, one embodiment herein includes an integrated circuit for controlling a power supply. The integrated circuit can include multiple connectivity ports, on-board memory, and control logic. The multiple connectivity ports such as pins, pads, etc., of the integrated circuit can be configured to provide connections between internal circuitry residing in the integrated circuit and other circuitry such as external circuitry residing on a circuit board to which the integrated circuit is attached. The memory of the integrated circuit supports storage of data. The mode control logic of the integrated circuit can be configured to receive input from an external source with respect to the integrated circuit to create a power island on the circuit board to power the integrated circuit.

In one embodiment, the input of the integrated circuit indicates a selection between a first operational mode in which the multiple connectivity ports are operable as input pins to write data to the memory and a second operational mode in which the multiple connectivity ports are operable as output pins to control a power supply circuit. Accordingly, embodiments herein include an integrated circuit that supports reuse of pins. For example, when in a first mode, the ports of an integrated circuit can operate in an input mode for writing of data to on-chip storage. When in a second mode, the ports of the integrated circuit can be configured as outputs for controlling a power supply circuit residing on the circuit board.

In further embodiments, the circuit substrate (to which the chip is attached) can include a group of circuitry that can be powered while the rest of the circuit board is unpowered. Thus, embodiments herein include a power island on a circuit board in which only a portion of circuitry on the circuit board or substrate is powered.

A so-called power island as described herein can be useful for programming of a power supply controller component. For example, assume that a circuit board handler or in-circuit tester receives a circuit board having an integrated circuit such as digital controller residing thereon. The circuit board can include a connector for receiving an input voltage to power a power supply and other circuitry residing on the circuit board. During in field operation, the digital controller operates in a switching mode in which the power supply converts the input voltage into a voltage that is suitable for powering other circuitry on the circuit board. However, instead of providing power to the connector to power the circuit board during handling by the circuit board handler, the board handler sets a magnitude of the input voltage at the connector below a threshold value to prevent powering of the circuitry on the circuit board. In other words, the circuit board handler can set the input voltage to ground. While the circuitry of the circuit board is unpowered by the input voltage, the board handler initiates application of electrical signals to pins of the integrated circuit residing on the circuit board.

In one embodiment, application of the electrical signals includes applying power to the integrated circuit while the rest of the circuit board is unpowered or depowered. In addition to applying power to the integrated circuit, by controlling a state of the electrical signals such as a clock and data signal applied to the integrated circuit while in the programming mode, the board handler writes data to on-chip storage in the integrated circuit. Accordingly, the on-chip storage can be programmed after populating a circuit board with circuit components.

Subsequent to programming on-board memory of the digital controller, the digital controller on the circuit board can be set to a second mode such as a switching mode in which the digital controller is operable to control a power supply. While in the second operational mode, one or more pins of the digital controller that previously supported writing of data to the on-board memory are instead used by the chip as outputs to control power supply circuitry on the circuit board. Accordingly, in contrast to conventional techniques, embodiments herein include reuse of pins as inputs and outputs depending on a mode setting.

The embodiments as described herein are advantageous over conventional techniques. For example, as mentioned above, it is possible to write custom data to on-chip storage of an integrated circuit after the integrated circuit has been mounted on a respective circuit board. This latter way of writing data to the on-board storage such as non-volatile memory may be particularly desirable for use in cases that require derivation of custom trim information based on an already fabricated circuit board. That is, custom data for writing to memory in the digital controller can be derived based on testing a respective circuit board. Thereafter, the custom trim information can be downloaded at a testing stage during handling rather than programmed by a manufacturer of the integrated circuit. Enabling a customer to write to on-board memory during manufacturing also alleviates the vendor of the digital controller from having to keep track of so many different parts and corresponding program information.

These and other more specific embodiments are disclosed in more detail below.

Example embodiments of the invention may be implemented within products and/or software applications such as those developed or manufactured by CHiL Semiconductor of Tewksbury, Mass., USA.

As discussed above, techniques herein are well suited for use in integrated circuit having on-chip non-volatile memory. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As will be discussed herein, a digital controller resides on a circuit board. During operation, the digital controller outputs control signals to control a power supply for delivery of power to a load. For example, the integrated circuit can include multiple connectivity ports, on-board memory, and mode control logic. The multiple connectivity ports such as pins, pads, etc., of the digital controller can be configured to provide connections between internal circuitry residing in the digital controller and external circuitry residing on a circuit board to which the digital controller is attached. The mode control logic in the digital controller monitors a status of one or more connectivity ports of the integrated circuit to detect when a board handler places the digital controller in a power island mode in which the integrated circuit is powered so that the board handler can access (e.g., read from/write to) the memory in the digital controller integrated circuit while other portions of the circuit board are unpowered.

Figure 1:
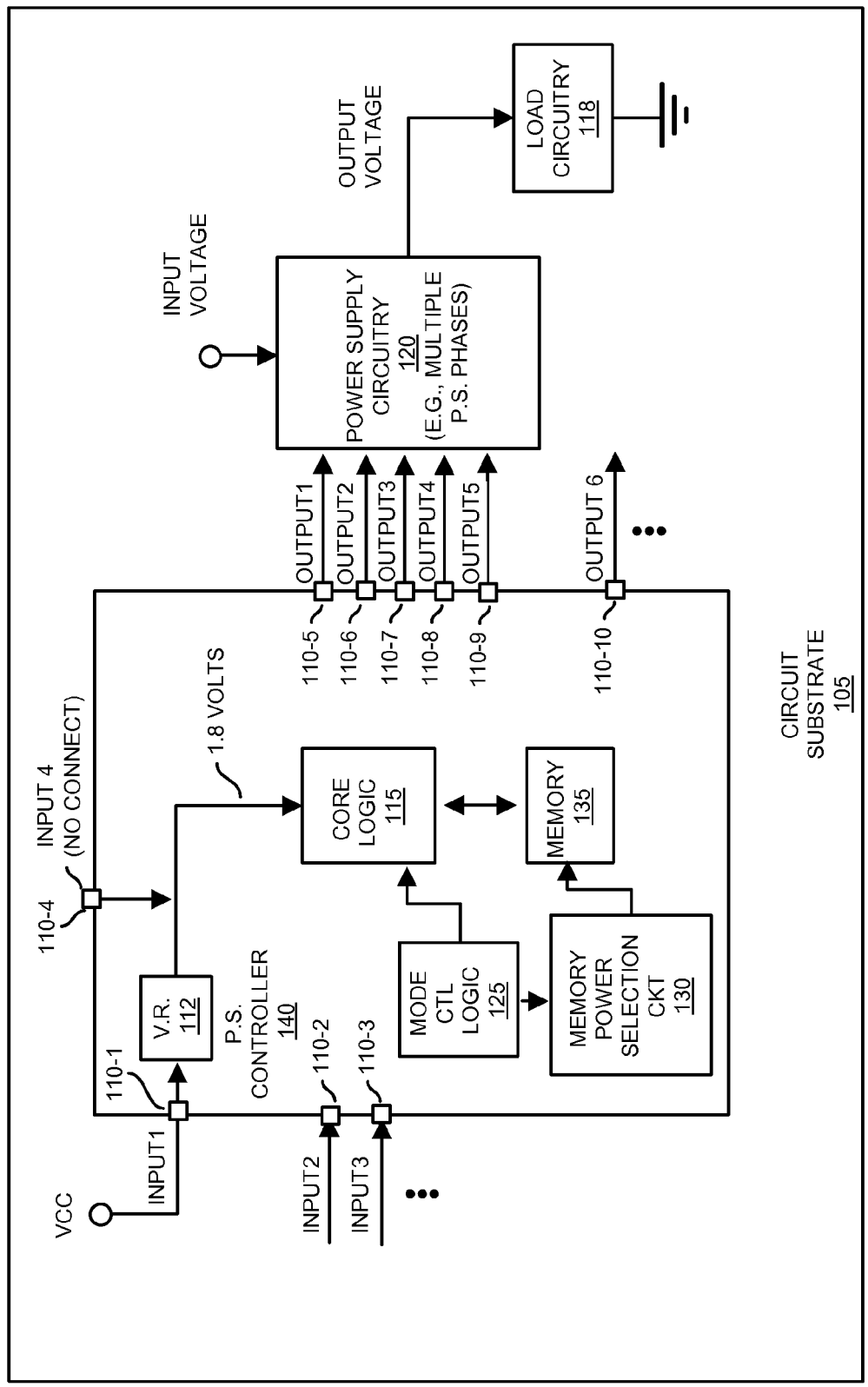
FIG. 1 is an example diagram of a power supply controller operating in a first mode according to embodiments herein.

Now, more specifically, FIG. 1 is an example diagram illustrating a circuit substrate 105 and corresponding power supply controller 140 according to embodiments herein.

As shown, circuit substrate 105 includes a power supply controller 140 residing thereon. By way of a non-limiting example, circuit substrate 105 can be a printed circuit board, flex board, etc., upon which corresponding circuitry resides. Also by way of a non-limiting example, power supply controller 140 can be a digital controller, integrated circuit, semiconductor chip, etc., residing on circuit substrate 105.

Power supply controller 140 includes multiple connectivity ports 110 for receiving input signals and outputting signals to other circuitry external to the power supply controller 140. By way of a non-limiting example, the multiple connectivity ports 110 can represent pins, pads, ports, conductive elements, etc., for interfacing the power supply controller 140 to other circuitry.

More specifically, the multiple connectivity ports 110 of power supply controller 140 are configured to provide connections between internal circuitry of the power supply controller 140 and external circuitry residing on the circuit substrate 105 to which the power supply controller 140 is attached. As will be discussed later in this specification, the power supply controller 140 also can be temporarily in electrical communication with an in-circuit tester, programmer, etc. Thus, in certain cases, the power supply controller 140 can receive input from or provide output to external sources other than circuits residing on circuit substrate 105.

The power supply controller 140 can be configured to receive input indicating a mode setting in which to set the power supply controller 140. For example, the mode control logic 125 in power supply controller 140 can be configured to monitor one or more signals received through connectivity ports 110. As will be discussed later in this specification, the signals received at connectivity ports 110 can be mode control signals used for setting the power supply controller 140 into a desired mode such as a switching mode or a programming mode. Based on monitoring of one or more connectivity ports 110 of the power supply controller 140, the mode control logic 125 can be configured to select between different operational power supply modes.

By way of a non-limiting example, the mode control logic 125 of power supply controller 140 can monitor voltages at connectivity port 110-1, connectivity port 110-2, connectivity port 110-3, connectivity port 110-4, connectivity port 110-5, and connectivity 110-10. However, note that any suitable set of one or more connectivity ports can be monitored to determine a mode setting.

Based on first input to the mode control logic 125, the mode control logic 125 can be configured to place the power supply controller 140 into an operational mode in which a group of one or more connectivity ports are configured as outputs for controlling power supply circuitry 120. Based on second input as discussed in FIG. 2, the mode control logic 125 can be configured to place the power supply controller 140 into an operational mode in which the group of one or more of the multiple connectivity ports 110 are configured as inputs for writing of data to the memory 135. Accordingly, during one mode (in FIG. 1), connectivity ports of the power supply controller 140 can be used as outputs for controlling power supply circuitry 120. During another mode (as in FIG. 2), the connectivity ports can be used as outputs for controlling power supply circuitry 120.

Assume in this example that the mode control logic 125 receives input (from one or more connectivity ports 110) indicating to place the power supply controller 140 into a switching control mode in which the power supply controller 140 produces output control signals to control power supply circuitry 120. In such an instance, the power supply controller 140 produces output signals to control the power supply circuitry 120. Power supply circuitry 130 can be a power converter including one or more phases. While in the switching control mode, the power supply controller 140 generates control signals to control switching in the multiple power supply phases of power supply circuitry 120. Via the switching, the power supply circuitry 120 converts an input voltage such as 12 volts into an output voltage such as 3.3 volts to power respective load circuitry 118 on circuit substrate 105.

The power consumption of load circuitry 118 may vary over time. When in the switching control mode, the power supply controller 140 monitors the output voltage and other parameters to produce appropriate control signals such as on output 1, output 2, output 3, output 4, output 5, output 6, etc., to maintain the output voltage within an acceptable range to power load circuitry 118. The control signals outputted by the power supply controller 140 can include pulse width modulation signals or any other suitable signals to control switching of the phases in power supply circuitry 120.

During operation when the power supply controller 140 is powered via application of Vcc to connectivity port 110-1, voltage regulator 112 converts Vcc into a corresponding voltage for powering core logic 115 of the power supply controller 140. In one embodiment, the voltage regulator 112 converts received Vcc into 1.8 volts for powering circuitry in the power supply controller 140.

When Vcc such as 3.3 volts is applied to connectivity port 110-1, the mode control logic 125 generates a signal to indicate that the power supply controller 140 is to be operated in a power supply switching control mode in which the core logic 115 generates control signals (e.g., output 1, output 2, output 3, output 4, output 5, output 6, etc.) to control power supply circuitry 120 and derive the output voltage to power the load 118. More details of mode control logic 125 are discussed with respect to FIG. 2.

Additionally, note that when Vcc such as 3.3 volts is applied to connectivity port 110-1, the mode control logic 125 generates a selection signal that is transmitted to the memory power selection circuit 130. Based on the received selection signal, the memory power selection circuit 130 selects between the voltage applied at connectivity port 110-1 and the voltage applied at connectivity port 110-4 for powering the memory 135. In this example, when the voltage at connectivity port 110-1 is 3.3 volts, the memory power selection circuit 130 selects the 3.3 volts received at connectivity port 110-1 for powering the memory 135.

Power supply controller 140 includes memory 135 for storing data such as power supply control information. In one embodiment, memory 135 represents non-volatile memory. However, note that memory 135 can represent any type of repository for storing data.

As previously discussed, when in the switching operational mode as discussed above, the core logic of 115 monitors the output voltage of power supply circuitry 120 and generates corresponding control signals. The core logic 115 can include access control logic to read and write to memory 135. Thus, during operation in a switching mode, the core logic 115 is able to access the data stored in memory 135. The data retrieved from memory 135 can include custom trim information associated with the power supply circuit residing on circuit substrate 105 enabling more efficient conversion of power by the power supply circuitry 120.

Figure 2:
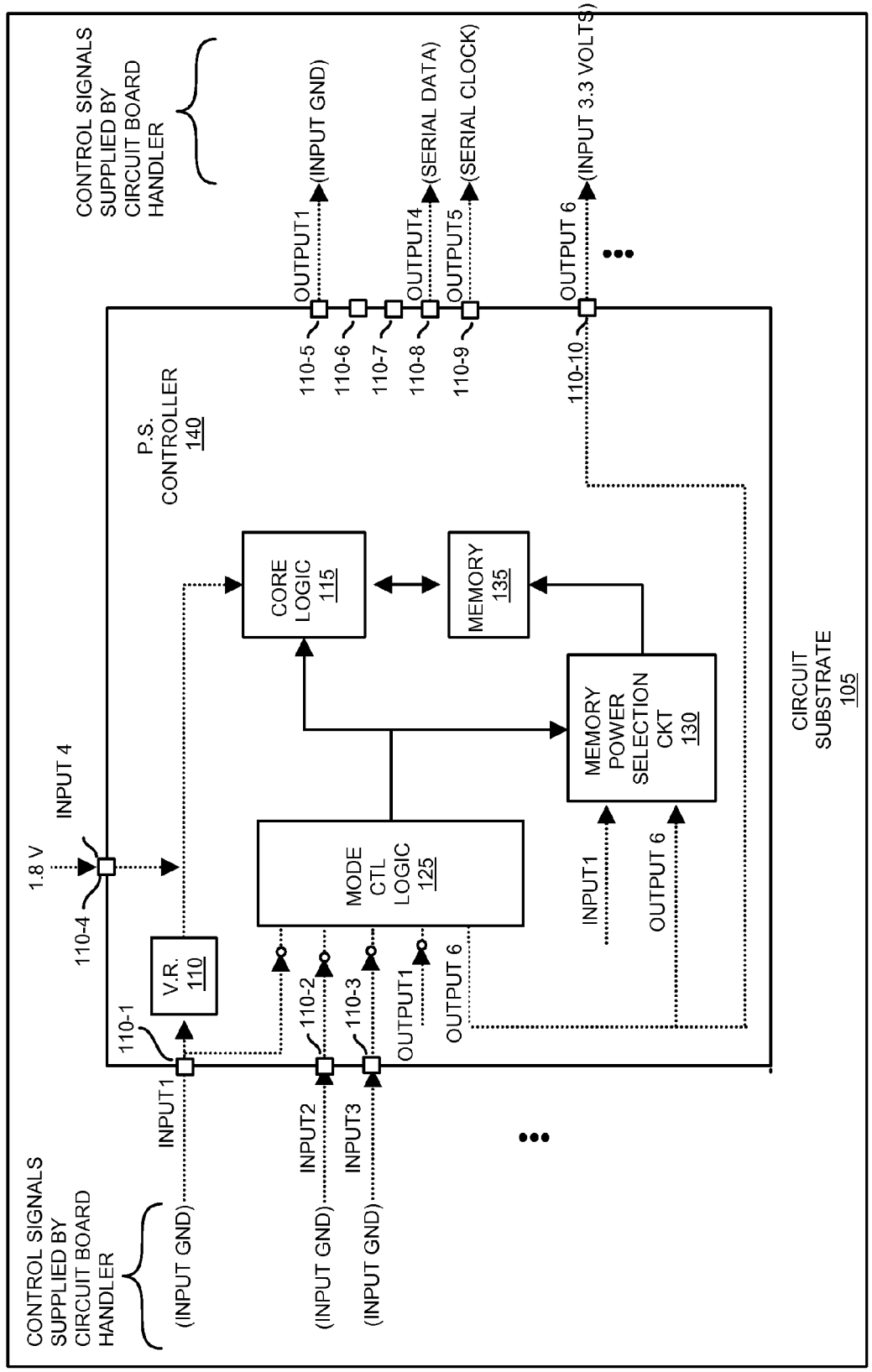
FIG. 2 is an example diagram of a power supply controller operating in a second mode according to embodiments herein.

FIG. 2 is an example diagram illustrating a power supply controller 140 in a second mode according to embodiments herein.

Assume in this example that a circuit board handler such as an in-circuit tester, memory programmer, customer, etc., receives the circuit substrate 105 and/or power supply controller 140 for programming of the memory 135 in the power supply controller 140. The programming of the memory 135 can occur prior to operation of the power supply controller 140 in the switching control mode as discussed above in FIG. 1.

In one embodiment, in order to program the memory 135 on power supply controller 140, the customer first applies voltages to a predefined set of connectivity ports 110. By way of a non-limiting example, in one embodiment, the circuit board handler applies a voltage such as ground or logic lo to input 1 at connectivity port 110-1; circuit board handler applies a voltage such as ground or logic lo to input 2 at connectivity port 110-2; circuit board handler applies a voltage such as ground or logic lo to input 3 at connectivity port 110-3; circuit board handler applies a voltage such as ground or logic lo to connectivity port 110-5; circuit board handler applies a voltage such as 3.3 volts or logic hi to connectivity port 110-10. These voltages can be applied via a bed of nails circuit tester that is removably attached to contacts points on substrate 105.

Mode control logic 125 receives the input voltages applied by the circuit board handler as discussed above. The mode control logic 125 can monitor inputs via a logical AND function. Based on the voltages inputted to the mode control logic 125, the mode control logic 125 generates a respective mode control signal indicating a corresponding operational mode of the power supply controller 140.

In this example, application of the different voltages to the connectivity ports 110 of the power supply controller 140 as discussed above places the power supply controller 140 in a programming mode instead of a switching mode. In other words, when the mode control logic 125 detects that connectivity port 110-1 is logic lo or set to ground, connectivity port 110-2 is logic lo or set to ground; connectivity port 110-3 is logic lo or set to ground, connectivity port 110-5 is logic lo or set to ground, and connectivity port 110-10 is logic hi or 3.3. volts, the mode control logic 125 selects the power supply controller 140 into a programming mode instead of the switching control mode as discussed above for FIG. 1.

The mode control logic 125 derives an internal mode control signal based on these voltages and outputs the mode control signal to the core logic 115 and memory 135 power selection circuit 130. The core logic 115 and memory receive the mode control signal as an input from the mode control logic 125. The mode control signal (when set to the programming mode) indicates to the core logic 115 to enable programming of memory 135.

More specifically, when in the programming mode, the circuit board handler can write data to memory via control of the serial data and serial clock signal applied to connectivity port 110-8 and serial data signal applied to connectivity port 110-9. Also, while in the program mode, via use of the serial data and serial clock signal, the circuit board handler is able to read data from memory 135 as well as write data to memory 135.

While in the programming mode, note that the circuit board handler applies a ground voltage to connectivity port 110-1 instead of applying voltage Vcc such as 3.3 volts. The voltage at connectivity port 110-1 therefore no longer can be used to power the memory 135. In such an instance, the memory 135 is powered by the voltage input received at connectivity port 110-10. For example, mode control logic 125 forwards the mode control signal to memory power selection circuit 130. The received mode control signal indicates that the power supply controller 140 is placed in the programming mode and selects the voltage at connectivity port 110-10 for powering memory 135.

While in the programming mode, the circuit board handler applies a voltage such as 1.8 volts to connectivity port 110-4. Accordingly, during the programming mode, the 1.8 volts received at connectivity port 110-4 also is applied to core logic 115 as the voltage regulator 112 is unable to convert the ground voltage at connectivity port 110-1 into 1.8 volts for powering the core logic 115.

As discussed above, by way of a non-limiting example, the mode control logic 125 can provide a logical AND functionality. For example, the mode control logic 125 switches between operating the power supply controller 140 in a first operational mode (e.g., a programming mode) and a second operational mode (e.g., a switching mode) depending on a state of voltages at connectivity ports 110-1, 110-2, 110-3, 110-5, and 110-10. More specifically, the power supply controller 140 can be placed in the programming mode by applying a logic lo signal to each of connectivity ports 110-1, 110-2, 110-3, 110-5 and applying a logic hi signal to connectivity port 110-10. When mode control logic 125 is a logical AND, setting of any voltage to a different set of values results in setting the power supply controller 140 into the normal switching control mode as discussed above in FIG. 1. Accordingly, it is highly unlikely (as discussed with respect to FIG. 2) that the power supply controller 140 will be accidentally placed in the programming mode during normal operation (such as when the power supply controller 140 supports switching control) because multiple input pins must be simultaneously set to an appropriate logic state to place the power supply controller 140 into the programming mode.

In one embodiment, performs a specific sequence of steps to power only the power supply controller 140 residing on the circuit substrate 105. For example, the circuit board handler can set the power supply controller 140 into the programming mode by first applying a logic lo signal to each of connectivity ports 110-1, 110-2, 110-3, 110-5 and applying a logic hi signal to connectivity port 110-10 as discussed above. Thereafter, the circuit board handler ramps up the voltage at connectivity port 110-4 from ground to 1.8 volts.

Subsequent to ramping the voltage at connectivity port 110-4, the circuit board handler ramps up the voltage at connectivity port connectivity port 110-10 to 3.3 volts. The serial clock and serial data bus can then be controlled in accordance with a communication protocol such as SMBUS to read and/or write to memory 135.

Note that the specific configuration of monitoring multiple voltages such as electrical signals at connectivity ports 110-1, 110-2, 110-3, 110-5, and 110-10 as discussed above is shown by way of non-limiting example only. More general embodiments herein can include monitoring a voltage signal such as monitoring the voltage applied to connectivity port 110-1. The voltage signal (e.g., Vcc) at connectivity port 110-1 is normally above a threshold value (e.g., a threshold value for detecting different logic levels) when the power supply controller 140 is operated in the switching mode. When in the programming mode, the mode control logic 125 detects that the voltage signal (e.g., ground) is less than the threshold value.

Figure 3:
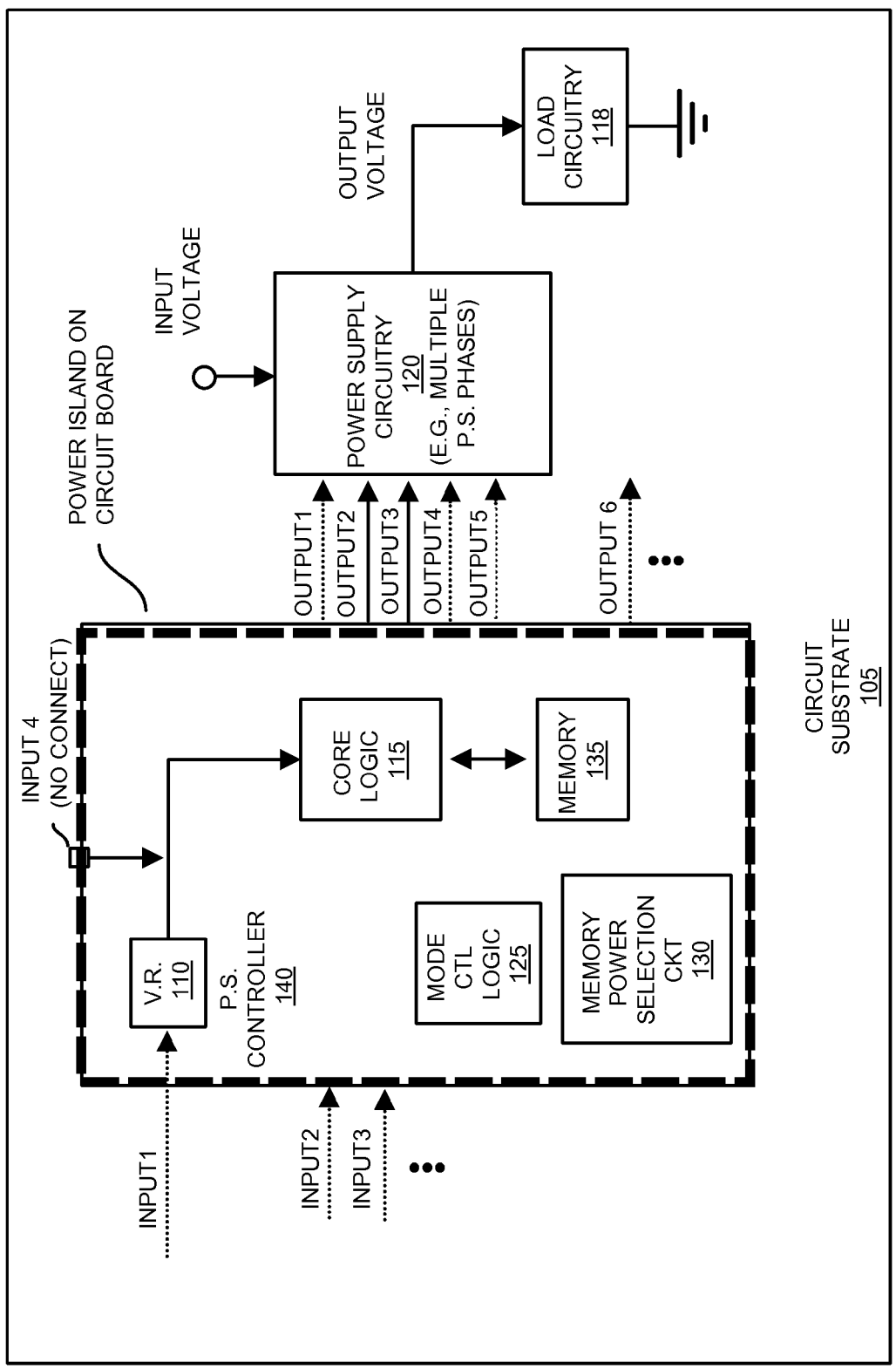
FIG. 3 is an example diagram illustrating powering of a portion of a circuit substrate to program memory according to embodiments herein.

FIG. 3 is an example diagram illustrating setting of the power supply controller 140 into a programming mode according to embodiments herein. As shown, only the power supply controller 140 is powered for programming the on-board memory 135 while the balance of circuits such as power supply circuitry 120 and load circuitry on the circuit substrate 105 are not powered.

Creation of a power island on circuit substrate 105 in which only a portion of the circuitry on the circuit substrate 105 is powered enables programming of the power supply controller 140 based on reuse of pins (e.g., certain connectivity ports 110) in the different modes. Thus, embodiments herein can include initiating application of one or more mode control voltage signals to connectivity ports of the power supply controller 140 to enable powering of the power supply controller 140 on the circuit substrate 105. After being powered, the circuit board handler can read from or write to memory 135 via control and data lines while circuitry other than the power supply controller 140 residing on the circuit board is depowered.

Reuse of the pins on power supply controller 140 reduces an overall package size associated with the power supply controller 140. For example, rather than dedicate multiple connectivity ports to solely provide a programming interface, connectivity ports of the power supply controller are used for different purposes depending on the mode of the power supply controller 140. Thus, a circuit board handler can initiate application of electrical signals to pins of the power supply controller 140 to set the power supply controller 140 into a desired mode.

As discussed above, application of the electrical signals can include driving a set of one or more pins (e.g., connect port) of the power supply controller 140 with one or more control signals to set the power supply controller 140 into a mode for accessing (e.g., reading or writing) data to the memory 135. Also, as described herein, one or more connectivity ports can be an output port in one mode and an input during another mode.

Additionally, note that embodiments herein are useful in applications in which the circuit board handler is a bed of nails circuit tester. Typically, a bed of nails circuit tester may not be able to provide enough power to power an entire circuit board under test. However, it may be desirable that the bed of nails tester be able to program the memory 135 during a process of testing other circuitry on the circuit substrate 105. As described herein, the bed of nails circuit board tester can test different components residing on the circuit substrate 105 as well as apply appropriate voltages to the connectivity ports 110 as described herein to power only the power supply controller 140 rather than power all circuitry residing on circuit substrate 105. Accordingly, a customer can conveniently program the memory 135 with data as opposed to populating the circuit substrate with a pre-programmed integrated circuit received from a vendor.

Figure 4:
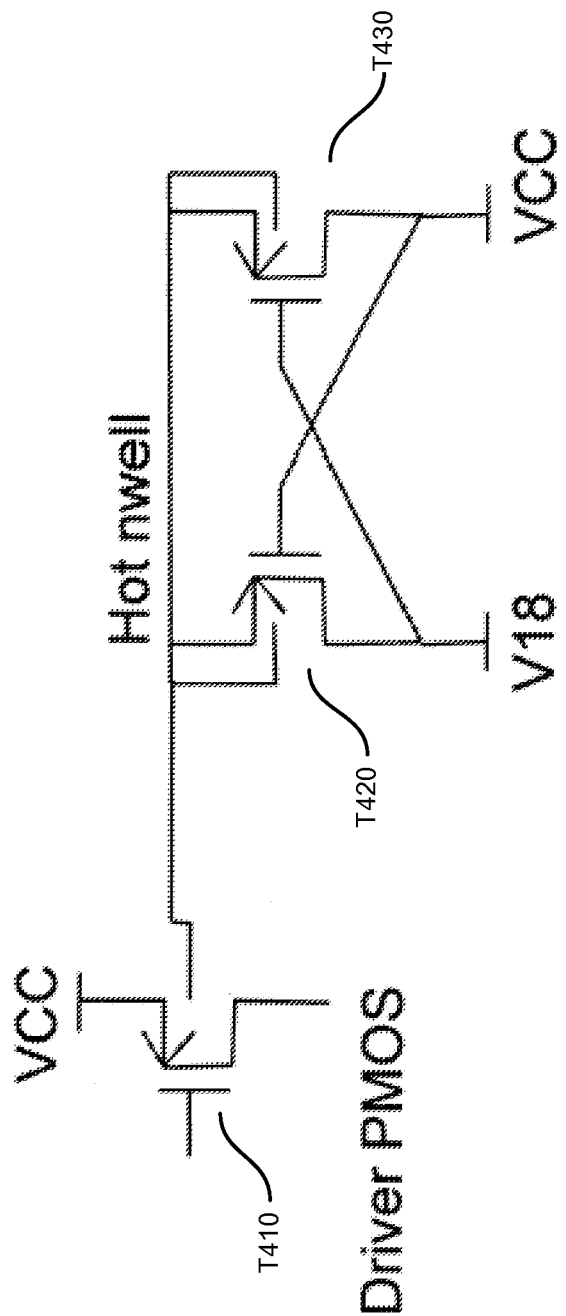
FIG. 4 is an example diagram of biasing one or more transistors in an output driver circuit according to embodiments herein.

FIG. 4 is an example diagram illustrating a way of protecting output drivers in the power supply controller 140 according to embodiments herein.

As previously discussed, certain connectivity ports such as connectivity ports 110-5, 110-8, 110-9, and 110-10 are used as outputs when the power supply controller 140 is set to operate in the switching mode. When in the programming mode, these ports are configured as inputs for receiving electrical signals generated by a circuit board handler.

In one embodiment, the output driver circuits in the power supply controller 140 can be protected so that they are not damaged when the respective connectivity ports 110-5, 110-8, 110-9, and 110-10 are used as inputs. For example, a corresponding driver circuit couples to each of the connectivity ports 110-5, 110-8, 110-9, and 110-10 to output pulse width modulation control signals as discussed above when in the switching mode.

However, when in the programming mode, the power supply controller 140 shuts off the corresponding driver circuits and uses the corresponding connectivity ports as inputs instead of outputs. The corresponding driver circuits, although shut OFF, therefore will be exposed to a voltage inputted at the respective connectivity port. Application of a voltage to the output stage of the driver circuit while it is shut off could cause damage in conventional applications. To prevent damage, embodiments herein can include configuring each of the output driver circuits connected to connectivity ports 110-5, 110-8, 110-9, and 110-10 to include a set of cross-coupled switches to couple a higher voltage of multiple voltages (e.g., 1.8 volts or Vcc) to bias a hot well node of the driver.

In other words, when in the programming mode, the voltage at connectivity port is 110-4 is 1.8 volts. The 1.8 volts is applied to the voltage rail labeled V18. The voltage at connectivity port 110-1 (or rail voltage labeled Vcc) is set to ground. The higher of the two voltages is 1.8 volts. In the programming mode, transistor T420 turns ON to bias the hot n-well node of transistor T410 to 1.8 volts. Thus, when in the programming mode, the driver at a port such as connectivity port 110-5 may be off, but one or more field effect transistors in the corresponding driver can be biased to 1.8 volts. Application of 1.8 volts and/or a ground voltage to connectivity port 110-5 will not harm the driver in this mode.

When in the switching mode, the voltage at connectivity port is 110-4 is ground. Thus, the voltage of signal labeled V18 is ground. The voltage at connectivity port 110-1 or Vcc is 3.3 volts. The higher of the two voltages (V18 and Vcc) is Vcc, which is 3.3 volts. Transistor T430 turns ON to bias the hot n-well of transistor T410 to 3.3 volts.

Thus, when in the switching mode, the driver at a port such as connectivity port 110-5 will be activated to generate a control signal, but the field effect transistors in the corresponding driver will be biased to 3.3 volts.

Accordingly, the hot network-well of transistor T410 is biased to different voltage values depending on the selected operational mode of power supply controller 140. Because of the biasing as discussed above, the output driver circuits in the power supply controller 140 are not damaged when the respective connectivity ports of power supply controller 140 are used as inputs.

Figure 5:
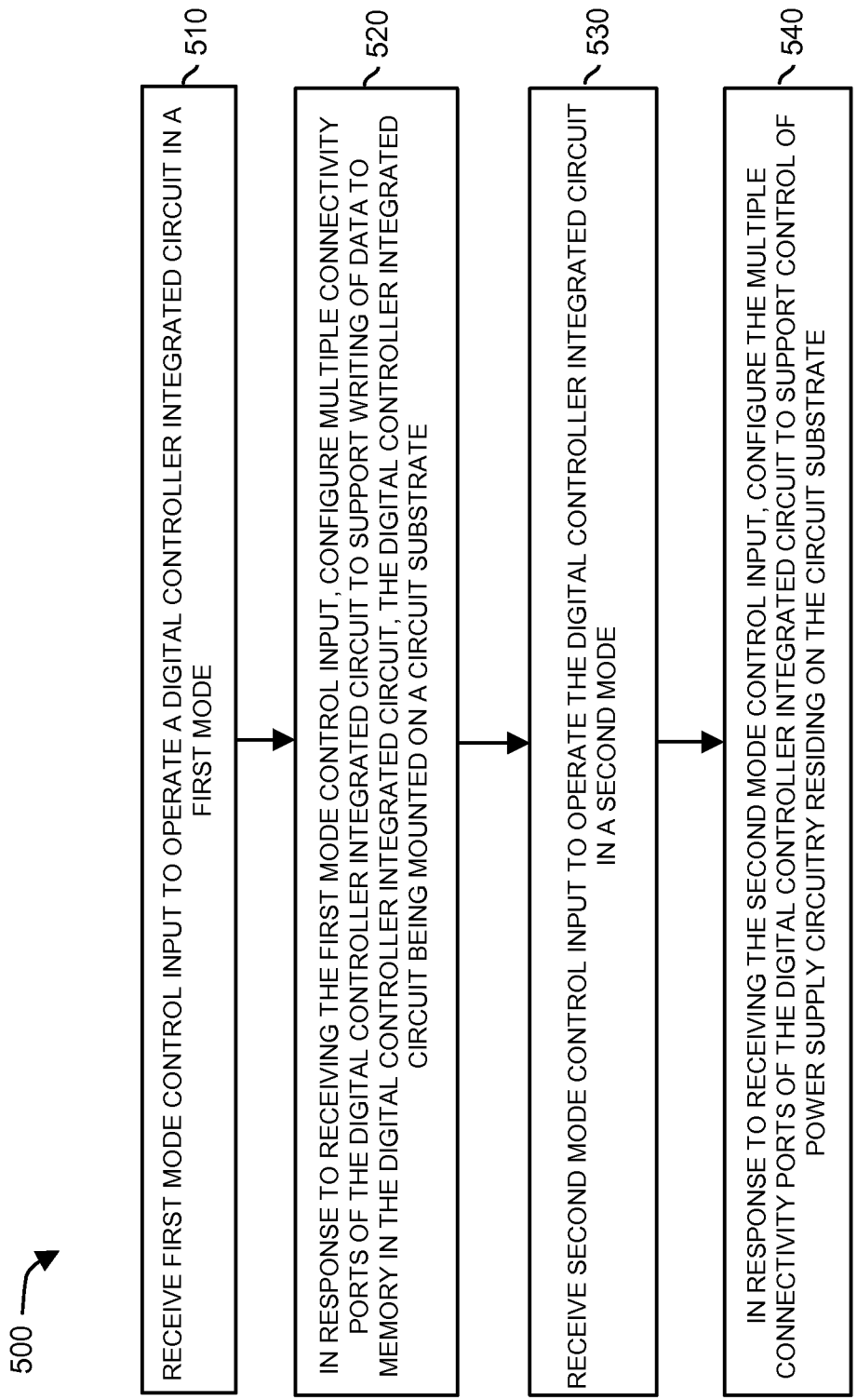
FIG. 5 is an example flowchart illustrating operation of a power supply controller in different modes according to embodiments herein.

FIG. 5 is a flowchart 500 illustrating an example method of operating in multiple different modes according to embodiments herein. Note that there will be some overlap with respect to concepts discussed above for FIGS. 1 through 4.

In step 510, the power supply controller 140 such as a digital controller receives first mode control input (e.g., certain voltage settings are applied to connectivity ports of the power management circuitry 140) to operate the power supply controller 140 in a first mode such as a programming mode to write data to memory 135.

In step 520, in response to receiving the first mode control input, the power supply controller 140 configures multiple connectivity ports 110 of the power supply controller 140 to support writing of data to memory 135. As previously discussed, the digital controller 140 can be mounted to a circuit substrate 105.

In step 530, the power supply controller 140 receives second mode control input (e.g., certain voltage settings are applied to connectivity ports of the power management circuitry 140) to operate the power supply controller 140 in a second mode such as a switching mode in which the power supply controller 140 controls operation of, for example, one or more power converter phases to produce an output voltage.

In step 540, in response to receiving the second mode control input, the power supply controller 140 configures multiple connectivity ports 110 of the power supply controller 110 to support control of power supply circuitry 120 residing on the circuit substrate 105.

Figure 6:
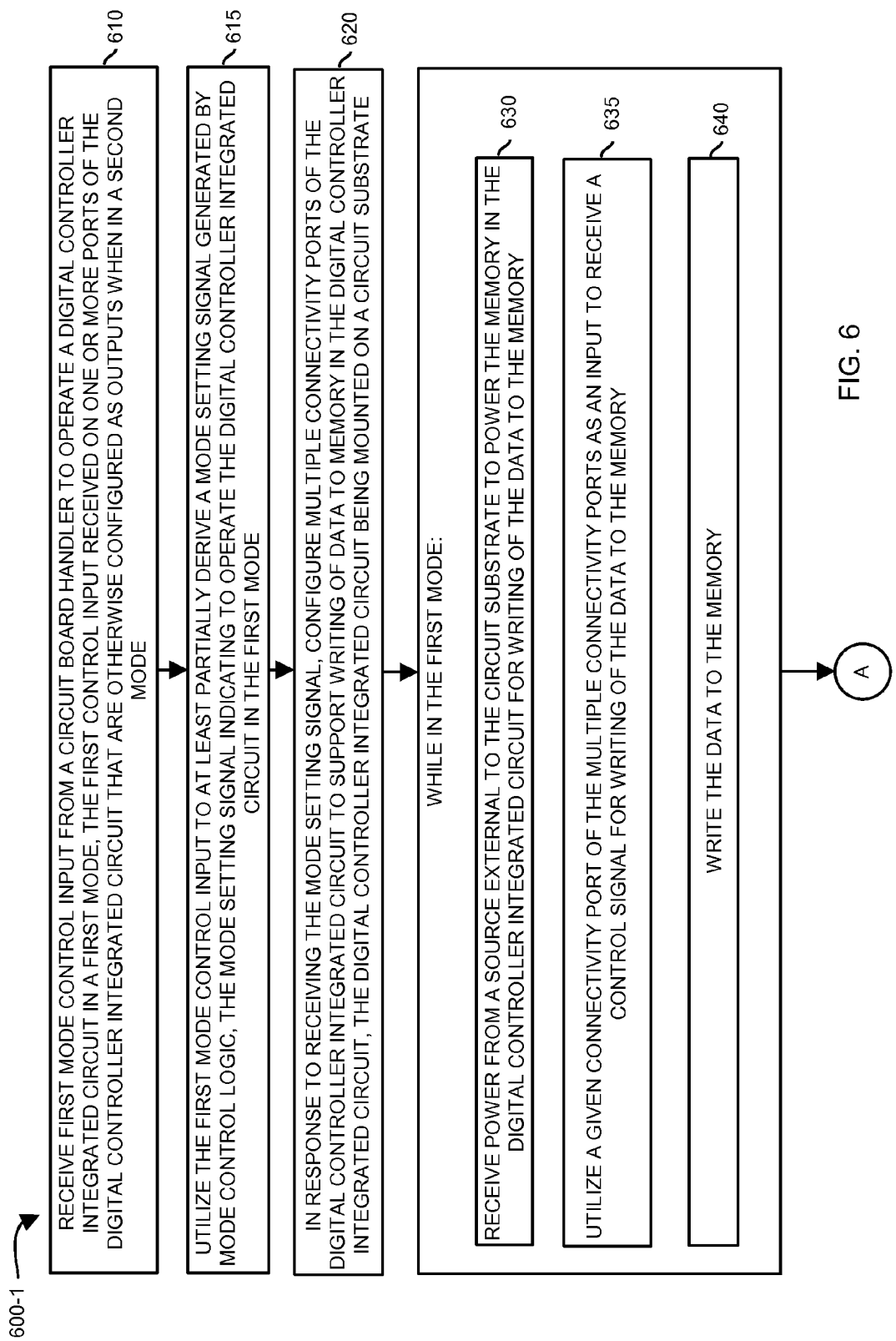
FIGS. 6 and 7 combine to form an example flowchart illustrating operation of a power supply controller in different modes according to embodiments herein.
Figure 7:
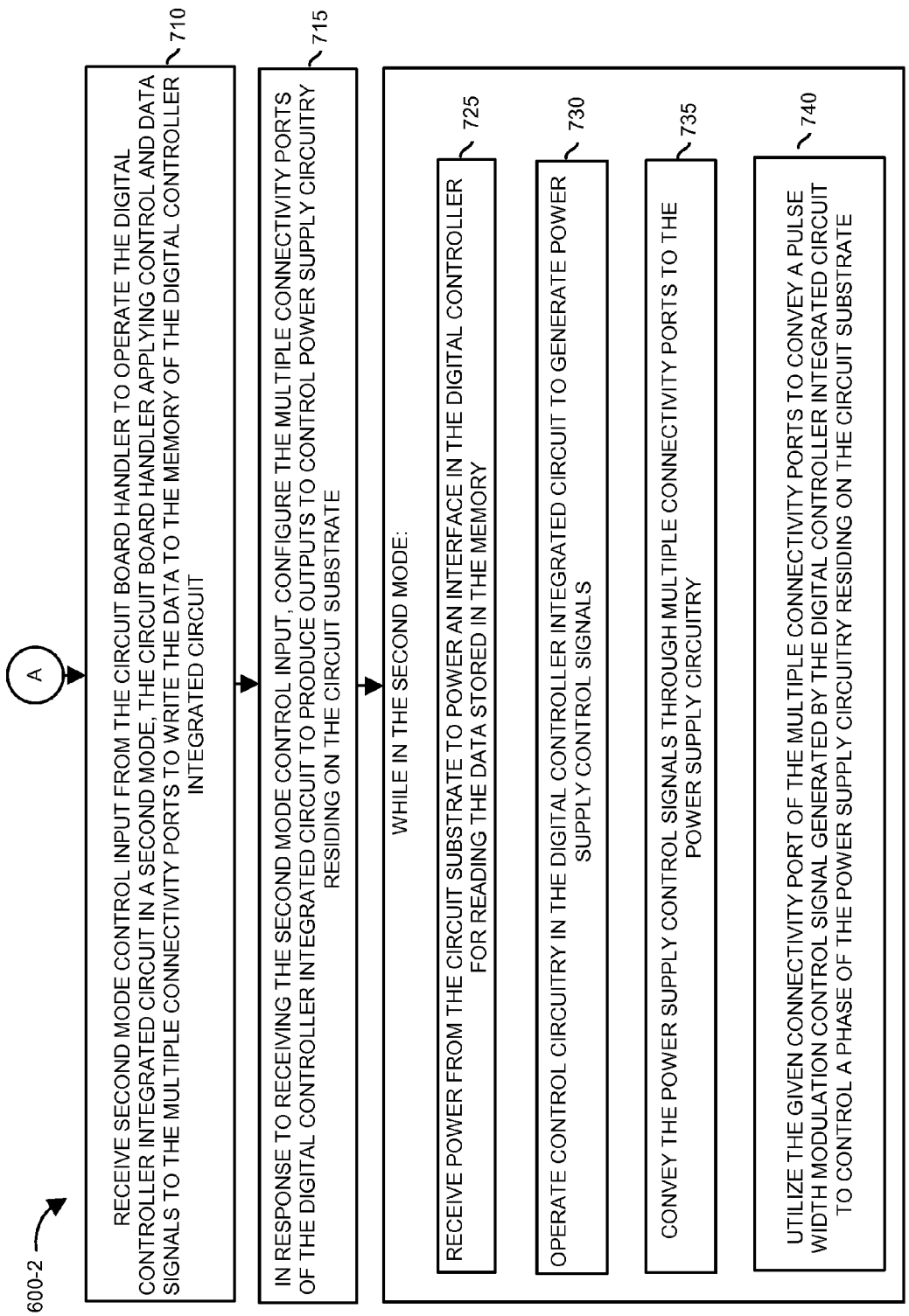

FIGS. 6 and 7 combine to form a flowchart 600 (e.g., flowchart 600-1 and flowchart 600-2) illustrating an example method of operating in multiple different modes according to embodiments herein.

In step 610, the power supply controller 140 receives first mode control input from a programmer or circuit board handler to operate the power supply controller 140 in a first mode (e.g., a programming mode). In one embodiment, the first control input is received on one or more pins or connectivity ports of the power supply controller 140 that are otherwise configured as outputs when in a second mode (e.g., a switching mode).

In step 615, the mode control logic 125 in the power supply controller 140 utilizes the first control input to at least partially derive a mode setting signal indicating to operate the power supply controller 140 in the first mode. As previously discussed, the mode control logic 125 selects which voltage input is used to power memory 135. Also, mode control logic 125 indicates to core logic 115 whether to operate the power supply controller 140 in the switching mode or memory programming mode.

In step 620, in response to receiving the mode setting signal generated by the mode control logic 125, the core logic 115 of the power supply controller 140 configures multiple connectivity ports 110 to support writing of data to memory 135. As previously discussed, the power supply controller can be mounted on a circuit substrate 105.

While in the first mode: In step 630, the power supply controller 140 receives power from a source external to the circuit substrate 105 to power the memory 135 for writing of data to the memory 135. In step 635, the power supply controller 140 utilizes a given connectivity port (e.g., connectivity port 110-8, 110-9, . . . ) of the multiple connectivity ports 110 as an input to receive a control signal for writing of the data to the memory 135. In step 640, the power supply controller 140 utilizes the given connectivity port of the multiple connectivity ports 110 to write the data to the memory 135.

In step 710, the power supply controller 140 receives second mode control input from a circuit board handler such as an in-circuit programmer to operate the power supply controller 140 in a second mode (e.g., a switching control mode). The second control input can be received from the circuit board handler based on conveyance of control and data signals to the multiple connectivity ports such as connectivity port 110-8 and 110-9 to write the data to the memory 135.

In step 715, in response to receiving the second mode control input, the power supply controller 140 configures multiple connectivity ports of the power supply controller 140 to support control of power supply circuitry 120 residing on the circuit substrate 105.

While in the second mode: In step 725, the power supply controller 140 receives power to power an interface in the power supply controller 140. The interface is used for reading the data stored in the memory 135. In step 730, the power supply controller 140 operates control circuitry in the digital controller integrated circuit to generate power supply control signals. In step 735, the power supply controller 140 conveys the power supply control signals through the multiple connectivity ports to the power supply circuitry 120 to control the power supply circuitry 120. In step 740, the power supply controller 140 utilizes a given connectivity port (that was previously an input port) as an output to control the power supply circuitry. In one embodiment, the power supply controller 140 utilizes the given connectivity port to convey a pulse width modulation control signal to a phase of the power supply circuitry residing on the circuit substrate.

Figure 8:
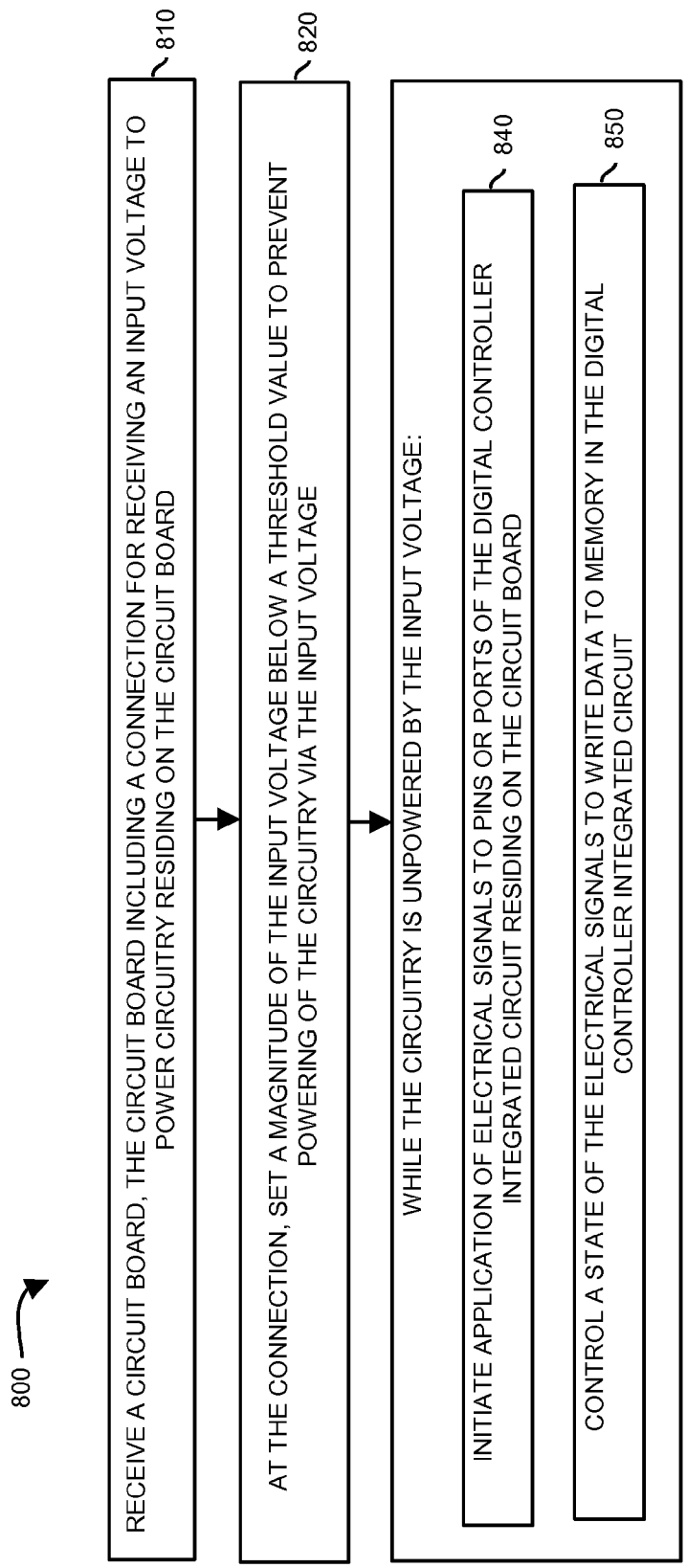
FIG. 8 is an example flowchart illustrating programming of memory in a power supply controller according to embodiments herein.

FIG. 8 is a flowchart 800 illustrating an example method of operating in multiple different modes according to embodiments herein.

In step 810, a circuit board handler receives a circuit substrate 105 such as a circuit board. The circuit board includes a connection for receiving an input voltage to power circuitry residing on the circuit board.

In step 820, at the connection, the circuit board handler sets a magnitude of the input voltage below a threshold value to prevent powering of the circuitry via the input voltage. For example, the circuit board handler sets the voltage at connectivity port 110-1 to ground instead of 3.3 volts. The circuit board handler also can set the input voltage of the circuit board such as 12 volts to a value of ground.

While the circuitry such as power supply circuitry 120 is unpowered by the input voltage: In step 840, the circuit board handler initiates application of electrical signals to connectivity ports or pins of the power supply controller 140 residing on the circuit board. In step 850, the circuit board handler controls a state of the electrical signals to write data to memory 135.

Note again that techniques herein are well suited for use in electronic parts such as those that provide power supply switching capabilities and control. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
in response to receiving first mode control input to operate a digital controller integrated circuit in a first mode, configuring multiple pins of the digital controller integrated circuit as inputs to write data to memory in the digital controller integrated circuit, the digital controller integrated circuit being mounted on a circuit substrate;
in response to receiving second mode control input to operate the digital controller integrated circuit in a second mode, configuring the multiple pins of the digital controller integrated circuit as outputs to control power supply circuitry residing on the circuit substrate;
receiving first control input from an in-circuit programmer, the in-circuit programmer removably connected to communicate with the digital controller integrated circuit on the circuit substrate, the first control input received on a pin of the digital controller integrated circuit that is configured as an input pin in the first mode, the pin configured as an output pin in the second mode; and utilizing the first control input to at least partially derive the first mode control input indicating to operate the digital controller integrated circuit in the first mode.

2. The method as in claim 1 further comprising:
in addition to receiving the first control input, receiving second control input from the in-circuit programmer, the second control input received from the in-circuit programmer based on the in-circuit programmer inputting control and data signals to the multiple pins to write the data to the memory of the digital controller integrated circuit; and
in the second mode: utilizing the pin as an output to control the power supply circuitry residing on the circuit substrate.

3. The method as in claim 1 further comprising:
while in the second mode:
operating control circuitry in the digital controller integrated circuit to generate power supply control signals; and
outputting the power supply control signals through the multiple pins to the power supply circuitry.

4. The method as in claim 1 further comprising:
while in the first mode, utilizing a given pin of the multiple pins as an input pin to receive a control signal for writing of the data to the memory; and
while in the second mode, utilizing the given pin as an output pin to control the power supply circuitry.

5. The method as in claim 1 further comprising:
while in the first mode, receiving power from the in-circuit programmer to power the memory in the digital controller integrated circuit for writing of the data to the memory; and
while in the second mode, receiving power from the circuit substrate to power an interface for reading the data stored in the memory.

6. The method as in claim 1 further comprising:
while in the first mode:
receiving power;
utilizing the power to power access control logic in the digital controller integrated circuit;
utilizing the access control logic to store the data in the memory of the digital controller integrated circuit;
while in the second mode:
receiving power from the power supply circuitry on the circuit substrate;
utilizing the power received from the power supply circuitry to power the access control logic in the digital controller integrated circuit;
utilizing the access control logic to retrieve data stored in the memory.

7. The method as in claim 1 further comprising:
while in the first mode, utilizing a given pin of the multiple pins to write the data to the memory; and
while in the second mode, utilizing the given pin of the multiple pins to convey a pulse width modulation control signal generated by the digital controller integrated circuit to control a phase of the power supply circuitry residing on the circuit substrate.

8. The method as in claim 1, wherein the pin is a first pin, the method further comprising:
from the first pin of the multiple pins, receiving a first mode control signal;
from a second pin of the multiple pins, receiving a second mode control signal; and
utilizing a combination of the first mode control signal and the second mode control signal to derive the first mode control input and the second mode control input.

9. A method comprising:
in response to receiving first mode control input to operate a digital controller integrated circuit in a first mode, configuring multiple pins of the digital controller integrated circuit as inputs to write data to memory in the digital controller integrated circuit, the digital controller integrated circuit being mounted on a circuit substrate;
in response to receiving second mode control input to operate the digital controller integrated circuit in a second mode, configuring the multiple pins of the digital controller integrated circuit as outputs to control power supply circuitry residing on the circuit substrate;
wherein receiving the first input indicating to operate the digital controller integrated circuit in the first mode further comprises:
monitoring a voltage signal, the voltage signal being normally above a threshold value when the digital controller integrated circuit is operated in the second mode; and
detecting that the voltage signal is less than the threshold value.

10. The method as in claim 1 further comprising:
operating the digital controller integrated circuit in the first mode while the power supply circuitry residing on the circuit substrate is depowered, the digital controller integrated circuit controlling the power supply circuitry in the second mode.

11. A method comprising:
in response to receiving first mode control input to operate a digital controller integrated circuit in a first mode, configuring multiple pins of the digital controller integrated circuit as inputs to write data to memory in the digital controller integrated circuit, the digital controller integrated circuit being mounted on a circuit substrate;
in response to receiving second mode control input to operate the digital controller integrated circuit in a second mode, configuring the multiple pins of the digital controller integrated circuit as outputs to control power supply circuitry residing on the circuit substrate;
while in the first mode:
receiving power on a first pin of the digital controller integrated circuit to power the memory; and
powering the memory via the power received on the first pin; and
while in the second mode:
receiving power from the circuit substrate on second pin of the digital controller integrated circuit to power the memory;
powering the memory via the power received on the second pin.

12. A method comprising:
in response to receiving first mode control input to operate a digital controller integrated circuit in a first mode, configuring multiple pins of the digital controller integrated circuit as inputs to write data to memory in the digital controller integrated circuit, the digital controller integrated circuit being mounted on a circuit substrate;
in response to receiving second mode control input to operate the digital controller integrated circuit in a second mode, configuring the multiple pins of the digital controller integrated circuit as outputs to control power supply circuitry residing on the circuit substrate;

wherein receiving the first mode control input further comprises:

monitoring a first power input pin, the first power input pin used in the second mode to power the memory; and operating the digital controller integrated circuit in the first mode based at least in part on detecting that the first power pin is below a threshold value; and while in the first mode, powering the memory via a voltage received on a second power input pin of the digital controller integrated circuit.

13. An integrated circuit comprising:

multiple pins, the multiple pins configured to provide connections between internal circuitry of the integrated circuit and external circuitry residing on a circuit board to which the integrated circuit is attached;

memory for storing data;

mode control logic, the mode control logic configured to receive control input from an external source with respect to the integrated circuit, the control input selecting between a first operational mode in which the multiple pins are input pins to write data to the memory and a second operational mode in which the multiple pins are output pins to control a power supply circuit;

the mode control logic receiving the control input from an in-circuit programmer, the in-circuit programmer removably connected to communicate with the integrated circuit on the circuit substrate, at least a portion of the control input received on a given pin of the integrated circuit that is configured as an input pin in the first operational mode, the given pin configured as an output pin in the second operation mode, and the mode control logic utilizing the control input to at least partially derive the first mode control input indicating to operate the integrated circuit in the first mode.

14. The integrated circuit as in claim 13, wherein the memory is non-volatile memory.

15. The integrated circuit as in claim 13, wherein the mode control logic further comprises:

a monitor circuit, the monitor circuit configured to monitor a power supply voltage and select, based at least in part on a magnitude of the power supply voltage, between the first operational mode and the second operational mode.

16. The integrated circuit as in claim 13, wherein at least one of the multiple pins is coupled to a driver, the driver including a set of cross-coupled switches to couple a higher voltage of multiple voltages to bias a hot well node of the driver to the higher voltage.

* * * * *